Dec. 22, 1931.  A. D. WHAMOND ET AL  1,837,843
SIGNAL EQUIPMENT FOR RAILWAY VEHICLES
Filed Nov. 12, 1930    2 Sheets-Sheet 2

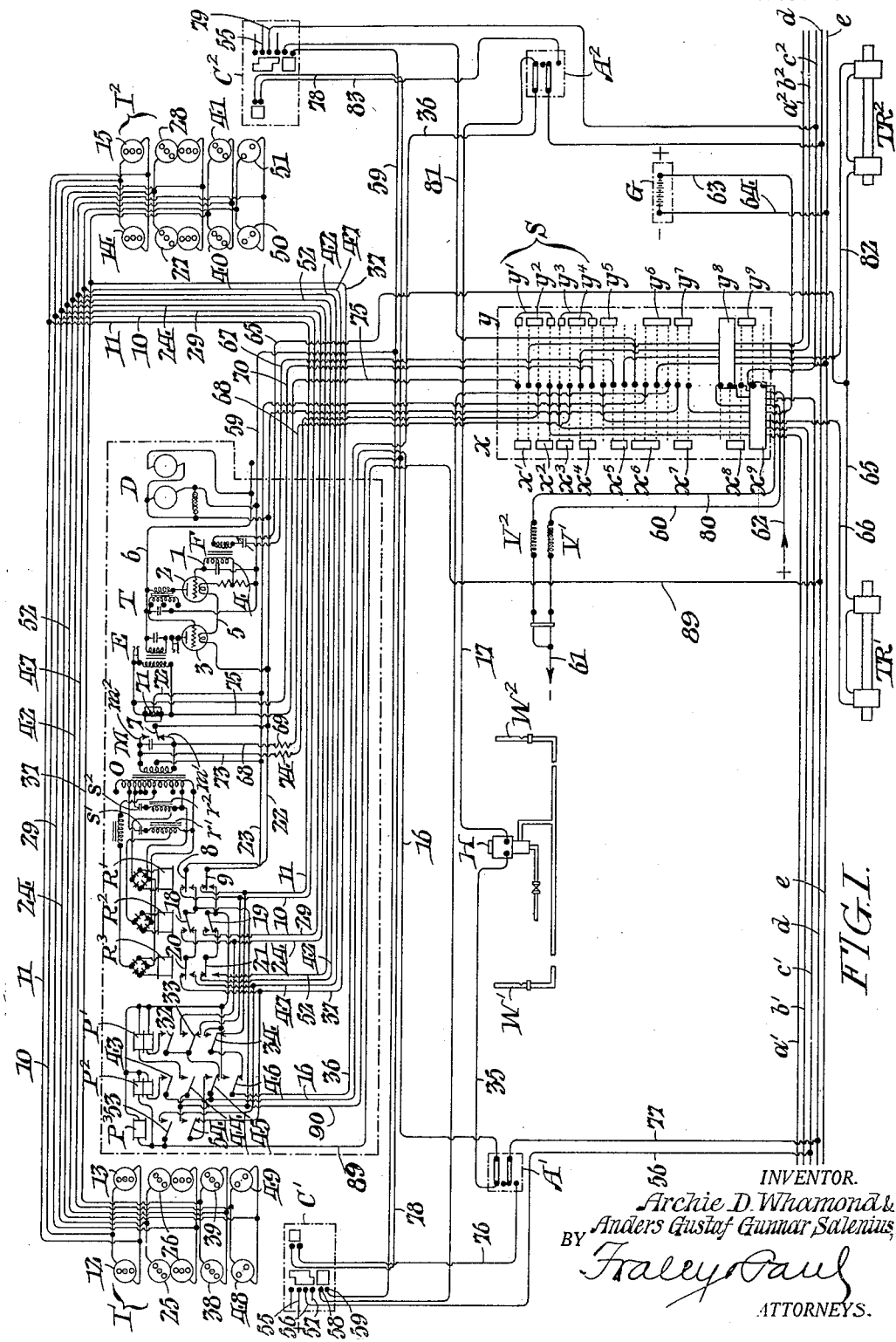

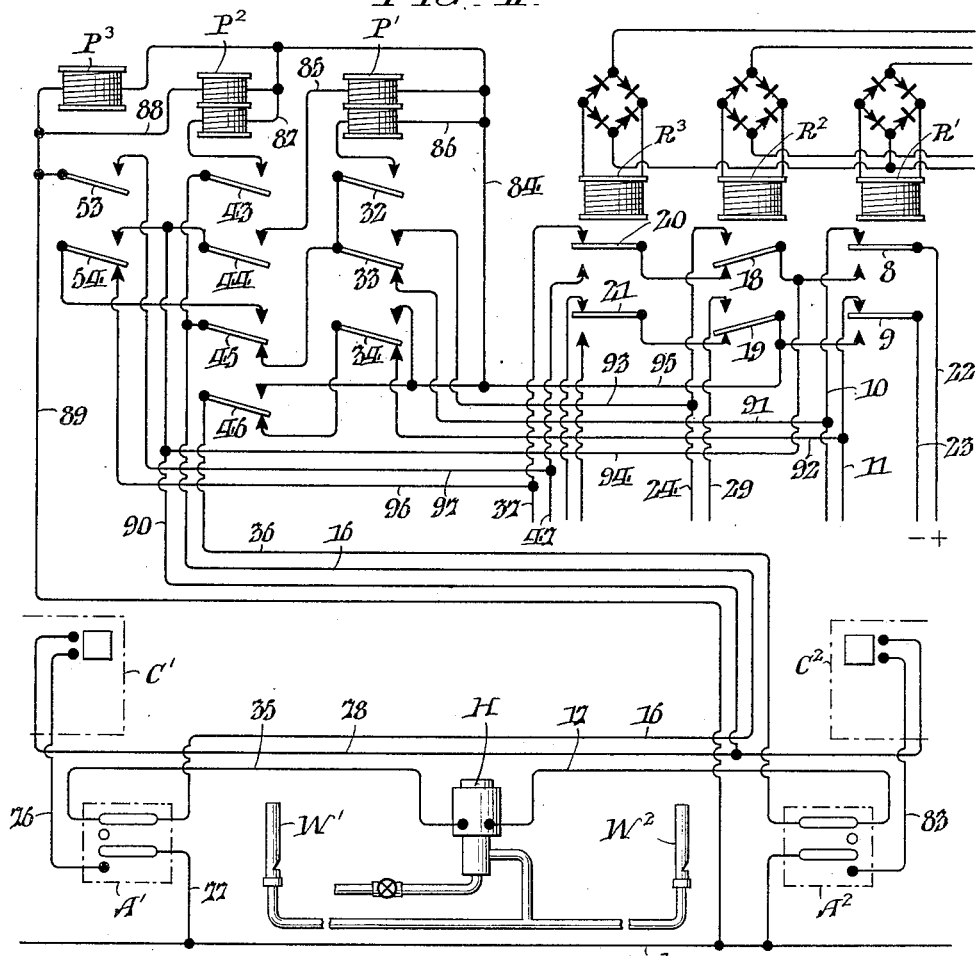

FIG. II.

FIG. III.

| CONDITION OF OPERATION | CODE | POSITION OF RELAY FINGERS (UP OR DOWN) | | | | | |
|---|---|---|---|---|---|---|---|
| | | RELAY R¹ | RELAY R² | RELAY R³ | RELAY P¹ | RELAY P² | RELAY P³ |
| CLEAR | 180 | UP | DOWN | UP | DOWN | DOWN | DOWN |
| APPROACH RES'T'G UNACKNOWLEDGED | 120 | DOWN | UP | UP | DOWN | DOWN | DOWN |
| APPROACH RES'T'G ACKNOWLEDGED | 120 | DOWN | UP | UP | UP | DOWN | DOWN |
| APPROACH UNACKNOWLEDGED | 80 | DOWN | DOWN | UP | DOWN | DOWN | DOWN |
| APPROACH ACKNOWLEDGED | 80 | DOWN | DOWN | UP | UP | UP | DOWN |
| CAUTION SLOW SPEED UNACKNOWLEDGED | — | DOWN | DOWN | DOWN | DOWN | DOWN | DOWN |
| CAUTION SLOW SPEED ACKNOWLEDGED | — | DOWN | DOWN | DOWN | UP | UP | UP |

WITNESSES
John A. Weidler
William Bell, Jr.

INVENTORS:
Archie D. Whamond &
Anders Gustaf Gunnar Salenius,
BY Fraley Paul
ATTORNEYS.

Patented Dec. 22, 1931

1,837,843

UNITED STATES PATENT OFFICE

ARCHIE D. WHAMOND, OF PHILADELPHIA, AND ANDERS GUSTAF GUNNAR SALENIUS, OF ALTOONA, PENNSYLVANIA

SIGNAL EQUIPMENT FOR RAILWAY VEHICLES

Application filed November 12, 1930. Serial No. 495,048.

This invention relates to signal equipment for locomotives or multiple unit trains, such as used with a continuous inductive code signal system, and the invention is particularly directed to apparatus for repeating cab signal indications on a group of vehicles coupled in multiple. When operating a group of locomotives, for example, connected in multiple, the engineman's helper must as a rule spend considerable time on the trailing units, inspecting the operation of the auxiliary apparatus, heating boilers and other parts. It is, therefore, very desirable that the engineman's helper be kept informed of the condition of the trackway in advance and that he be notified of any change of signal indication, both by visible indicators and audible warning alarms on the trailing units, so that, if the engineman takes no action in the case of a restrictive signal, the helper may proceed to the engineman's station and take proper action. The provision of means for repeating cab signal indications and alarms on trailing units, so that information as to the condition of the trackway in advance may be transmitted from the forward vehicle to one or more trailing vehicles, is the principal object of the present invention.

Another object of the invention is to provide as a part of the standard signal equipment of a railway vehicle, circuits adapted for interconnection with identically similar equipment on a vehicle in advance or in the rear, whereby with a group of vehicles so equipped and connected in multiple in any combination as to order or direction of heading, all cab indicators and warning alarms will be simultaneously operated, the signal equipment of each unit being further characterized by the provision of devices for automatically selecting the proper track receiver and setting up the circuits of the several units so that the code impulses may be transmitted from one unit to another in the proper direction.

Supplementing the above objects and advantages of our invention are those derived from the use of interchangeable signal equipment on vehicles coupled in multiple which permits an acknowledgment of a change to a more restrictive signal to be made only from the engineman's position at the forward end of the leading vehicle.

One example or embodiment of our invention is described hereinafter with reference to the accompanying drawings, whereof:

Fig. I represents a diagrammatic view of the complete cab signal equipment of an electric locomotive.

Fig. II represents an enlarged diagrammatic view of that part of the equipment shown in Fig. I which comprises the acknowledging circuits; and, Fig. III represents a chart showing the positions of the fingers or contacts of the decoding and acknowledging relays under different conditions of operation.

In Fig. I of the accompanying drawings there is shown a diagram of the circuits comprising the cab signal equipment of one electric locomotive embodying the invention. When the locomotive is coupled with others in any combination as to the order of ends, it is to be assumed that the equipment of each unit is identical in every respect.

The two ends of the locomotive are conveniently referred to as the No. 1 end and the No. 2 end. Associated with each end of the locomotive, there is a train-carried receiver TR, designated with an exponent corresponding to the number by which the end of the locomotive is identified, into which coded rail current is induced. There are also separate acknowledging switches A, control cut-out and reset switches C, cab signal indicators I, (each set comprising two groups of indicators, one for the engineman and one for his helper), and warning whistles W, similarly designated, for each end of the locomotive. Train line jumper cables are used for connecting the circuits of one locomotive with another. Leading from the No. 1 end to one train line jumper cable are five conductors $a^1$, $b^1$, $c^1$, $d$ and $e$, and leading from the No. 2 end to another train line jumper cable is another group of five conductors $a^2$, $b^2$, $c^2$, $d$ and $e$, some of which are common to the first group.

The apparatus selected for the reception of coded current from a trackway transmitter, for amplifying and converting the same to code impulses and for decoding the code impulses to selectively energize different circuits which lead to visible indicators is conveniently referred to herein as "the code converting equipment" and comprises instrumentalities now commonly used in the so-called continuous inductive code system with whistle and acknowledger. In order to repeat the indications received on the leading locomotive on one or more trailing locomotives, circuits have been provided interlocking the code converting equipment of the leading locomotive with the code converting equipments of the trailing locomotives. Inasmuch as coded current from the train-carried receiver of the leading locomotive of a group of locomotives coupled in multiple cannot, due to limitations in capacity, be divided to operate concurrently the code converting equipment of each locomotive, and inasmuch as the limited current carrying capacity of the decoding relays of the converting equipment does not permit paralleling the indicators of a group of locomotives, the repetition of cab signal indications on all locomotives of a group is accomplished herein by connecting an intermediate stage of the code converting equipment of the leading locomotive with an intermediate stage of the code converting equipment of the second locomotive.

As the code converting equipment shown in the drawings comprises instrumentalities which are now in common use, the operation of this equipment by itself on a single locomotive need only be briefly described, it being understood that the present invention relates more particularly to the interlocking of the equipment of one vehicle with another, and that the invention may be applied to other types of code converting equipment than the one herein selected for purposes of description.

Alternating current at a frequency of 100 cycles per second and coded by variation in the character of the current—for example, by the use of steady current, no current and interruptions at the rate of 80, 120 and 180 per minute—is induced into train-carried receivers $TR^1$ and $TR^2$, and from thence transmitted through circuits to be later described to the primary coil of the filter F of the code converting equipment. A lead 1 from the secondary coil of the filter F is connected to the grid of the first of two amplifier tubes 2 and 3, and the other lead 4 from the secondary coil of the filter F is connected to the filament circuit 5 upon which 32 volt current is impressed. Plate current for the first and second stage amplifier tubes 2 and 3 is supplied from a dynamotor D at 300 volts over conductor 6. In the plate circuit of the first stage tube 2 there is an interstage transformer T, whose secondary is connected to the grid of the second stage tube 3.

The output circuit of the second stage tube 3 is connected to a code frequency transformer E, conveniently termed the "master transformer". When the induced alternating current is interrupted there is a periodic variation in the direct current in the primary of the master transformer E, which results in a low frequency alternating current, of a code frequency equal to the number of interruptions of the coded current induced in the track receiver, in the secondary of the master transformer E, and through the winding of the master relay M. The master relay M is periodically energized in opposite directions and its armature 7 moves from one contact $m^1$ to the other contact $m^2$ at the code frequency. The operation of master relay armature 7 connects 32 volt direct current alternately to one end or the other of the primary of the decoding transformer O, inducing code frequency alternating current in the secondary coil of the decoding transformer.

Selective operation of the three decoding relays $R^1$, $R^2$ and $R^3$ is accomplished by an arrangement of circuits so that relay $R^1$ will be picked up only when 180 interruptions per minute are received, and so that relay $R^2$ will be picked up only when 120 interruptions per minute are received, and so that relay $R^3$ will be picked up when 80 interruptions per minute are received. Relay $R^3$ is also energized for all code interruptions. This selection is accomplished in the case of relays $R^1$ and $R^2$ by tuned resonant circuits including reactors $r^1$ and $r^2$ and condensers $s^1$ and $s^2$. The circuit of relay $R^3$ is not tuned.

When the rail current is interrupted 180 times per minute, relays $R^1$ and $R^3$ are picked up. Relay $R^1$ lifts contacts 8 and 9, which causes current to flow from conductor 22 which, as hereinafter described, is connected to the positive terminal of 32 volt battery G, through contact 8 to conductor 10 and thence through lights 12 and 13 of indicators $I^1$ at the No. 1 end and lights 14 and 15 of indicators $I^2$ at the No. 2 end, displaying the "clear" signal indication, returning over conductor 11 and contact 9 of relay $R^1$ to conductor 23 which, as hereinafter described, is connected to the negative terminal of a 32 volt battery G. Whistle magnet valve H is also caused to be energized through conductors 16 and 17, current to the magnet valve H passing through the back contacts of acknowledging relays $P^1$ and $P^2$, as hereinafter described under "Acknowledgment."

When the rail current is interrupted 120 times per minute, relays $R^2$ and $R^3$ are picked up and relay $R^1$ is de-energized. Contacts 18 and 19 of relay $R^2$ and contacts 20 and 21 of relay $R^3$ are lifted causing current to flow from conductor 22 through contact 8 of relay $R^1$ (dropped) and contact 18 of relay $R^2$ to conductor 24 and thence through lights 25 and 26 of indicators $I^1$ and lights 27 and 28 of indicators $I^2$, displaying the "approach restriction" indication, returning over conductor 29 to contact 19 of relay $R^2$, and thence through contact 9 of relay $R^1$ to conductor 23. Under this condition relay $R^1$ being de-energized, the energizing circuit of whistle magnet valve H is broken, causing warning whistles $W^1$ and $W^2$ to sound, and, if desired, initiating an automatic train stop through a delayed action valve forming part of the pneumatic equipment of the locomotive (this apparatus being not shown but readily understood by those familiar with automatic train signal systems). To suppress the warning whistle, as well as to forestall an automatic brake application if such equipment is provided, acknowledging switches $A^1$ and $A^2$ and acknowledging relays $P^1$, $P^2$ and $P^3$ are provided. Acknowledgment is made by reversing acknowledging switch $A^1$ or $A^2$, depending upon the end from which the locomotive is operated, as hereinafter described under "Acknowledgment."

When the rail current is interrupted 80 times per minute, relay $R^3$ is picked up and relays $R^1$ and $R^2$ are deenergized. Contacts 20 and 21 being lifted, current flows from conductor 22, contact 8 of relay $R^1$ (dropped), contact 18 of relay $R^2$ (dropped), to contact 20 of relay $R^3$ to conductor 37 which leads to light 38 and 39 of indicators $I^1$ and lights 40 and 41 of indicators $I^2$, displaying the "approach" indication, returning over conductor 42 to contact 21 of relay $R^3$ and thence through contact 19 of relay $R^2$ (dropped) and contact 9 of relay $R^1$ (dropped) to conductor 23. Acknowledgment is made by reversing acknowledging switch $A^1$ or $A^2$, as hereinafter described under "Acknowledgment."

When there is no code in effect, the master relay M will be at rest and the three relays $R^1$, $R^2$ and $R^3$ will be deenergized, and their respective contacts in down position. Current then passes from conductor 22, contact 8 of relay $R^1$ (dropped), contact 18 of relay $R^2$ (dropped), contact 20 of relay $R^3$ (dropped) to conductor 47, which leads to lights 48 and 49 of indicator $I^1$ and lights 50 and 51 of indicator $I^2$, displaying the "caution-slow-speed" signal, and returning over conductor 52 to contact 21 of relay $R^3$ (dropped), and thence through contact 19 of relay $R^2$ and contact 9 of relay $R^1$ (dropped) to conductor 23. Acknowledgment is made by reversing acknowledging switch $A^1$ of $A^2$, as hereinafter described under "Acknowledgment".

For transferring circuits from one locomotive to another as hereinafter described, certain devices have been added to the standard cab signal set, the operation of which has been described above. These devices comprise two master control cut-out and reset switches $C^1$ and $C^2$, one for each end of the locomotive, and an automatic set-up switch S, which, when in one energized position, makes circuit connections as indicated by the schematic development of connectors at $x$, and when in the other energized position makes circuit connections as indicated by the schematic development of connectors at $y$, and which in neutral or normal position makes contact only at connectors $x^9$ and $y^8$. Associated with the automatic set-up switch S, there are connections 63 and 64 from a battery G which supplies 32 volt current to the dynamotor D, the filaments of amplifier tubes 2 and 3, the decoding relays $R^1$, $R^2$, and $R^3$, and the acknowledging relays $P^1$, $P^2$ and $P^3$. The set-up switch S is controlled by magnet valves $V^1$ and $V^2$. When magnet valve $V^1$ is energized, the set-up switch is moved to the position in which contacts are made as indicated by connectors $y^1$—$y^9$. When magnet valve $V^2$ is energized, the set-up switch is moved to the position in which contacts are made as indicated by connectors $x^1$—$x^9$.

The manner in which the automatic set up switch S and the cut-out and reset switches $C^1$ and $C^2$ operate is hereinafter described with reference to the various orders in which a group of locomotives may be coupled.

Acknowledgment

The term "acknowledging" refers to either the action taken by the engineman, upon a change of signal indication, to suppress the sound of a warning whistle, or, if automatic train stop equipment is provided, to the action taken to forestall an automatic brake application. Acknowledgment in the present example of our invention, wherein a warning whistle is provided, is accomplished by reversing acknowledging switch $A^1$ or $A^2$, depending upon the end from which the locomotive is operated, and permitting the return of the switch (by spring action) to its original position. The complete acknowledging circuits are shown in Fig. II, and their operation is as follows:

When the rail current is interrupted 180 times per minute (the "clear" indication), the decoding relays $R^1$ and $R^3$ are energized and their contacts are therefore picked up, as before explained, and the $R^2$ relay is dropped. Acknowledging relays $P^1$, $P^2$ and $P^3$ are all de-energized, and their contacts are dropped, for these relays can only be energized when current flows in conductors 84 and 89, and when the contacts of the decoding relay $R^1$ are lifted there is no connection between conductor 22 (positive) and conductor 84, and conductor 89 leads through conductor $d$ to openings at acknowledging switches $A^1$ and $A^2$.

Under this condition current flows from conductor 22 (positive) to contact 8 (lifted)

of relay R¹, to conductor 10, to conductor 91, to contact 33 (dropped) of acknowledging relay P¹, to contact 45 (dropped) of acknowledging relay P², to conductor 16, to acknowledging switch A¹ (assuming that the locomotive is operated from the No. 1 end), through the top blade of the switch, to conductor 35, to magnet valve H, to conductor 17 to acknowledging switch A², through the top blade of the switch, to conductor 36, to contact 46 (dropped) of acknowledging relay P², to contact 34 (dropped) of acknowledging relay P¹, to conductor 92, to conductor 11, to contact 9 (lifted) of decoding relay R¹, to conductor 23 which is connected to the negative terminal of battery G. Accordingly magnet valve H is energized and there is no sounding of the warning whistles W¹ and W² while the "clear" code is in effect.

When the rail current is interrupted 120 times per minute (the "approach restricting" indication), the decoding relays R² and R³ are energized and their contacts are therefore picked up, as before explained, and the relay R¹ is dropped. While this indication remains unacknowledged, acknowledging relays P¹, P² and P³ are all de-energized and their contacts are dropped, for, although there is now a connection between conductor 22 (positive) and conductor 84 through contact 9 (dropped) of decoding relay R¹, conductor 89 leads, through conductor d, to openings at acknowledging switches A¹ and A². Under this condition the de-energizing of decoding relay R¹ breaks the connection from conductor 22 (positive) to conductor 10 over contact 8 (dropped) of relay R¹ and hence opens the previously described circuit to the magnet valve H, de-energizing the magnet valve H, and causing warning whistles W¹ and W² to sound. Furthermore, the circuit from conductor 22 (positive) to contact 8 (dropped) of decoding relay R¹, to contact 18 (lifted) of decoding relay R², to conductor 24, to conductor 93, to contact 33 of acknowledging relay P¹ is broken at contact 33 for this contact is dropped, and consequently magnet valve H remains de-energized.

As decoding relay R¹ is de-energized, in this situation, a connection is made from conductor 22 (positive) over contact 8 (dropped) of relay R¹, to conductor 94, to conductor 90, to conductor 78, which leads to the control cut-out and reset switches C¹ and C², and, accordingly, assuming that control cut-out and reset switch C¹ is closed, this circuit is continued through conductor 76 to acknowledging switch A¹. To acknowledge the "approach restricting" indication acknowledging switch A¹ is reversed. Current then flows from conductor 22 (positive) to acknowledging switch A¹ over the circuit described above, and from thence through conductor 77, conductor d and conductor 89 to acknowledging relay P³, which is thereupon energized, to conductor 84, to conductor 95, to contact 9 (dropped) of decoding relay R¹, to conductor 23 (negative). At the same time current flows from conductor 89 to conductor 88, to acknowledging relay P² and thence to conductor 84. This picks up acknowledging relay P² which in turn causes current to flow from conductor 22, over contact 8 (dropped), to conductor 94, to conductor 90, over contact 44 of acknowledging relay P², to conductor 85, to acknowledging relay P¹ and hence to conductor 84, energizing acknowledging relay P¹.

Since in this situation decoding relay R¹ is down and decoding relay R² is up, current flows from conductor 22 (positive) through contact 8 (dropped) of decoding relay R¹, to contact 18 (lifted) of decoding relay R², to conductor 24, to conductor 93, to contact 33 (lifted) and to contact 32 (lifted) of acknowledging relay P¹, to conductor 86, which constitutes a second winding of acknowledging relay P¹, to conductor 84, to conductor 95, to contact 9, to conductor 23 (negative) forming a stick circuit for acknowledging relay P¹, so that this relay remains energized even after the acknowledging switch A¹ is returned to normal position by spring action when the operator's hand releases the switch.

With acknowledging relay P¹ energized and its contacts lifted, conductor 24 is connected through conductor 93 to contact 33 of relay P¹, but current cannot pass through the contacts of acknowledging relay P² since these contacts are lifted. When acknowledging switch A¹ returns to normal position by its spring action, current can no longer flow from conductor 76 to conductor 77, and consequently the energizing circuits of acknowledging relays P² and P³ over conductors 89 and 88 are broken, causing relays P² and P³ to drop their contacts.

Current then flows from contact 33 of acknowledging relay P¹ to contact 45 (dropped) of relay P² to conductor 16, to acknowledging switch A¹, to conductor 35, through magnet valve H, to conductor 17, through acknowledging switch A², to conductor 36, to contact 46 (dropped), of relay P², to contact 34 (lifted) of relay P¹ to, conductor 95, to contact 9 (dropped) of relay R¹, to conductor 23 (negative). The warning whistles W¹ and W² are thus suppressed and acknowledgment is therefore completed for the "approach restricting" signal indication.

When the rail current is interrupted 80 times per minute ("approach" indication) decoding relays R¹ and R² are de-energized and their contacts are therefore dropped, as before explained, and relay R³ is energized with its contacts lifted. As decoding relay R² is de-energized, conductors 24 and 93 are de-energized, and the previously described stick circuit through conductor 86 of acknowledging relay P¹ is broken. Consequently, acknowledging relay P¹ is dropped and magnet valve H is de-energized. Current flows from conductor 22 over contact 8 (dropped) of relay R¹, to contact 18 (dropped) of relay R², to contact 20 (lifted) of relay R³, to conductor 37, to conductor 96, to contact 54 (dropped) of acknowledging relay P³, but current cannot proceed further because contact 45 of relay P² is dropped.

When acknowledging switch A¹ is reversed to suppress the sounding of warning whistles W¹ and W², current is permitted to flow from conductor 22, to contact 8 (dropped) of decoding relay R¹, to conductor 94, to conductor 90, to conductor 78, to control cut-out and reset switch C¹ to conductor 76, to acknowledging switch A¹, to conductor 77, to conductor d, to conductor 89, to acknowledging relay P³, energizing this relay, to conductor 84, to conductor 95, to contact 9 (dropped) of decoding relay R¹, to conductor 23 (negative). At the same time current flows from conductor 89, to conductor 88, and through the principal winding of acknowledging relay P² to conductor 84, thus energizing acknowledging relay P². Current then flows from conductor 90 to contact 44 (lifted) or relay P², to conductor 85, and through the principal winding of acknowledging relay P¹, to conductor 84, thus energizing acknowledging relay P¹.

For the establishment of the stick circuit, current flows from conductor 90 through contact 54 (lifted) of relay P³, to contact 45 (lifted) of relay P² to conductor 16, to contact 43 (lifted) of relay P², through conductor 87 (the lower winding of relay P²) to conductor 84. When acknowledging switch A¹ is restored to normal position, by release of the operator's hand, conductor 89 is de-energized. Acknowledging relay P³ then drops out, and the stick circuit is transferred and continued from conductor 37 through contact 54 (dropped) of relay P³, to contact 45 (lifted) of relay P² to conductor 16, to contact 43 (lifted) of relay P², to conductor 87 (the lower winding of relay P²) to conductor 84. There is sufficient time lag in the operation of acknowledging relay P² to bridge the time for the movement of contact 54 of relay P³ from lifted to dropped position.

In this situation current flows from conductor 37 to contact 54 (dropped) of relay P³ to contact 45 (lifted), to conductor 16, to acknowledging switch A¹, to conductor 35, to magnet valve H, to conductor 17, to acknowledging switch A², to conductor 36, to contact 46 (lifted) of relay P², to conductor 95, to contact 9 (dropped) of decoding relay R¹ to conductor 23 (negative). The magnet valve being energized, the acknowledgment is therefore complete for the "approach" indication.

When no current is present in the rails (the "caution slow speed" indication), decoding relays R¹, R² and R³ are all de-energized, with consequent deenergization of magnet valve H as before explained. The acknowledging circuit of the "approach" indication is now broken since when decoding relay R³ drops out, conductor 37 is de-energized and the previously described stick circuit through acknowledging relay P² is broken. Accordingly acknowledging relay P² is de-energized. There is now a connection from conductor 22 over contact 8 (dropped) of decoding relay R¹, over contact 18 (dropped) of relay R², over contact 20 (dropped) of relay R³ to conductor 47, to conductor 97, but current cannot flow from conductor 97 through contact 53 of relay P³ because this contact is dropped.

Reversing the acknowledging switch permits current to flow from conductor 22 (positive), over contact 8 (dropped), to conductor 94, to conductor 90, to conductor 78, to control cut-out reset switch C¹, to conductor 76 through acknowledging switch A¹, to conductor 77, to conductor d, to conductor 89, to acknowledging relay P³, to conductor 84, to conductor 95, to contact 9 (dropped) of relay R¹, to conductor 23 (negative). At the same time current flows from conductor 89 to conductor 88 (the upper winding of acknowledging relay P², to conductor 84, thus energizing acknowledging relay P² and causing its contacts to be lifted. Current then flows from conductor 90 over contact 44 (lifted) of acknowledging relay P² to conductor 85 (the upper winding of relay P¹) to conductor 84, thus energizing acknowledging relay P¹ and causing its contacts to be lifted.

The stick circuit is established and held by current flow from conductor 47, to conductor 97, to contact 53 (lifted) of relay P³, to conductor 89, to conductor 84, maintaining relay P³ energized. The stick circuit is also established from conductor 89 through conductor 88 (the upper winding of relay P²) to conductor 84, maintaining acknowledging relay P² energized.

When the acknowledging switch A¹ is restored to normal position, by release of the operator's hand, the circuit from conductor 76 to conductor 77, which leads through conductor d to conductor 89 is broken, but conductor 84 is held energized as described above. Current then flows from conductor 22, over contact 8 (dropped), to conductor 94, to conductor 90, to contact 54 (lifted), to contact 45 (lifted), of relay P², to conductor 16, to acknowledging switch A¹, to conductor 35, to magnet valve H, to conductor 17, to acknowledging switch A², to conductor 36 to contact 46 (lifted), of acknowledging relay P², to conductor 95, to contact 9 (dropped) of decoding relay R¹, to conductor 23 (negative) thus energizing magnet valve H. Current also flows from conductor 16 to contact 43 (lifted) of acknowledging relay P², to conductor 87 (the lower winding of relay P²)

to conductor 84, to contact 9 (dropped) of relay R¹, to conductor 23, thus maintaining relay P² energized over its stick circuit. With the magnet valve H thus held energized, the acknowledgment is complete for the "caution slow speed" indication.

When the locomotive is operated from the No. 2 end, acknowledgment is made by reversing acknowledging switch A² which, in view of the fact that the circuits leading to the acknowledging switches are precisely the same at each end, causes a precisely similar operation of the acknowledging relays.

*Locomotives connected in regular order*

When three locomotives are coupled together with No. 1 end forward on all units, the equipment operates as follows:

The engineman inserts an operating handle in control cut-out and reset switch C¹ which is at the No. 1 end of the leading locomotive. This handle is preferably fastened with a chain to a reverser handle, both being removable in their "off" positions only. Only one set of these handles tied together is supplied for a group of locomotives, thus insuring that only one control cut-out and reset switch and only one reverser will be operated on the group of locomotives.

The engineman moves control cut-out switch C¹ of the leading locomotive to "on" position which, as shown by the diagrammatic development of the switch in the drawing, forms contact between conductors 55, 56 and 57, and contact between conductors 58 and 59. Current from the positive side of the master control battery (not shown) passes through conductor 55 to conductor 57 and energizes the master control circuits. Current also passes through conductor 55 to conductor 56, and thence through conductor $c^1$ and connector $y^8$, which, as before explained is effective when the automatic set-up switch S is in neutral or normal position, to conductor 60, which leads through valve magnet V¹ to a connection from the negative terminal of the master control battery indicated at 61. Magnet valve V¹ being energized, the set-up switch S is moved, as before explained, closing contacts on this switch as indicated by connectors $y^1$ to $y^9$. In moving to this position connector $y^8$ maintains contact between conductors $c^1$ and 60, keeping magnet valve V¹ energized, which in turn holds the set-up switch in this position.

Connector $y^9$ makes contact between conductor 62, which is also connected to the positive side of the master control battery, and conductor $c^2$, which allows control battery current to flow through conductor $c^2$ to the train line jumper cable at the No. 2 end, entering the second locomotive on conductor $c^1$, and passing through its connector $y^8$, conductor 60, and valve magnet V¹ to negative terminal 61, causing the operation of the set-up switch S on the second locomotive. Furthermore, the set-up switch of the third locomotive will in turn be operated from the set-up switch of the second locomotive in the same manner. A return circuit from the connection indicated at 61 of the second and third locomotives is also carried through train line jumper cables back to the negative terminal of the master control battery on the first locomotive, but this circuit is essentially a part of the master control circuits and is not, therefore, shown in the drawings.

The automatic set-up switch S of the first locomotive having moved to close the connections indicated at $y$, current flows from the battery G, which is preferably as 32 volt battery, over conductor 63 and through connector $y^7$ to conductor 22 and thence into the signal equipment. The negative return path for this current is divided, current from all of the equipment except amplifier tubes 2 and 3 and dynamotor D returning over conductor 23 and connector $y^6$ and conductor 64 to the negative side of battery G. Current from the amplifier and dynamotor, however, must return over conductor 58 through the control cut-out and reset switch C¹ to conductor 59 and thence through connector $y^6$ and conductor 64 to the negative side of battery G. Thus the amplifier and dynamotor are energized only on the locomotive having the control cut-out and reset switch closed, which is the leading locomotive, while the decoding relays, acknowledging relays and cab indicators are energized by the operation of the automatic set-up switch, and hence are energized on all of the locomotives coupled together.

With reference to the train-carried receivers TR¹ and TR², it will be noted that one side of the receiver circuit, conductor 65, is common to each receiver. With automatic set-up switch S in the position previously noted, conductor 66 leading from receiver TR¹, which is on the No. 1 end of the locomotive, is connected through connector $y^5$ with conductor 67, which in turn leads to the primary coil of filter F of the amplifier of the signal equipment. From the other side of the primary coil of filter F conductor 65 provides a return path to the receiver TR¹.

In order to cause the equipment on the second and third locomotives to carry the same cab indication as the first locomotive, the code present in the rails under the leading receiver on the first locomotive must be carried to the equipment on the trailing units. However, the receiver, to be effective, must be positioned in advance of the first axle of the first locomotive, for the locomotive axles shunt the rail circuit and prevent current from being carried to the receivers on trailing locomotives.

In the arrangement shown a circuit is carried from the primary of the decoding transformer O of the leading locomotive to the master relay M on the second locomotive; and from the primary of the decoding transformer O of the second locomotive to the master relay M on the third locomotive, and so on for any number of locomotive units, in the following manner:

With the automatic set-up switch S in the position previously stated, current from the positive side of the supply, at conductor 22 flows through master relay armature 7 to conductor 68 which includes a resistor 69 and thence through connector $y^4$ and conductor $b^2$ to the train line jumper cable, entering the second locomotive on conductor $b^1$ and passing through connector $y^3$, and conductor 70 to one side of the master relay coil 71, leaving the coil through the mid-tap 72 and conductor 23 and passing through connector $y^6$ to conductor $e$, returning to the first locomotive on conductor $e$ and then passing through conductor 64 to the negative terminal on battery G, completing the circuit. Energy flowing in this circuit causes the armature of the master relay on the second locomotive to move to contact $m^1$ or $m^2$.

Upon the assumption that armature 7 of master relay M has moved to contact $m^1$, when the armature reverses with the code on the first locomotive and moves to $m^2$, current from conductor 22 flows through master relay armature 7 to contact $m^2$, and through conductor 73, which includes resistor 74, to connector $y^2$ of the set-up switch S and thence to conductor $a^2$, through the train line jumper cable, entering the second locomotive on conductor $a^1$ and passing through connector $y^1$ of its set-up switch to conductor 75 which leads to the other side of the master relay coil 71, leaving by the mid-tap 72 of coil 71 and conductor 23, and returning to the first locomotive and completing the circuit as previously described. Energy flowing in this circuit causes the master relay armature on the second locomotive to move to contact $m^2$.

Since the coded energy picked up from the trackway circuit is amplified and operates the master relay armature at 180, 120 or 80 reversals per minute, contacts $m^1$ and $m^2$ on the first locomotive will be energized, the circuits described in the preceding paragraph completed, and the master relay on the second locomotive will operate at exactly the same number of reversals per minute, thus establishing the code in the primary of the decoding transformer on the second locomotive. Accordingly, the cab signal indications will be set up from that point in the same manner as they are on the first locomotive.

These same circuits are energized between the second and third, third and fourth, etc., locomotives in like manner. It will be noted that the coded energy picked up by the leading receiver on the first locomotive governs the operation of the master relay on this unit; this master relay in turn governs, through the decoding transformer circuits described above, the operation of the master relay on the second locomotive; the master relay of the second locomotive in turn governs, through like circuits, the operation of the master relay on the third locomotive; and so on for any number of units coupled together. Accordingly, one function of the set-up switch S is to automatically connect the proper circuits to accomplish the transfer of coded energy from one locomotive to another in the proper direction.

In order to prevent the helper or helpers on a second or third locomotive from acknowledging a change of signal to a more restrictive indication from the trailing locomotives, energy to the acknowledging circuits is carried through the control cut-out and reset switch $C^1$ as hereinafter described.

Acknowledgment of a change from "clear" to a more restrictive indication is made in the usual manner by the reversal of acknowledging switch $A^1$. This connects conductor 76 to conductor 77. Conductor 76 is connected by the control cut-out and reset switch $C^1$ with conductor 78, which in turn is connected with conductor 22 (carrying positive battery current) whenever the "clear" code disappears, for the relay $R^1$ is then de-energized. Accordingly, when the acknowledging switch $A^1$ is reversed, acknowledging relays $P^2$ and $P^3$ will be picked up, with the proper relays holding them up over their own stick circuits. This causes whistle magnet nector $x^2$ to conductor $a'$, entering the second edging switch $A'$ is restored to normal position.

In the above described circuit conductor 76 is connected with conductor 78 at the control cut-out and reset switch $C^1$. Since the only control cut-out and reset switch which is in the "on" or closed position is the one at the engineman's station on the leading locomotive, only the acknowledging switch at that station can be effectively operated.

Acknowledgment on trailing units is accomplished from the leading locomotive by means of conductors $d$ and $e$ which pass through all units. Conductor $e$ is at all times connected through conductor 64 with the negative terminal of battery G. When conductor $d$ is connected on the first locomotive to the positive terminal of battery G, as when acknowledgment is made on the first locomotive, conductor $d$ on the second and third locomotives carries positive current and causes certain of the acknowledging relays to be energized, in the same manner in which corresponding relays are energized on the leading vehicle, which in turn re-energizes whistle magnet valve H on the second and third locomotives and suppresses the sounding of the warning alarm on these vehicles.

Operation from No. 2 end of leading unit

In the previous description it was assumed that the locomotives were coupled with reference to their ends in the order 1—2, 1—2, 1—2. When these locomotives are coupled in regular sequence, but in reverse order, that is 2—1, 2—1, 2—1, the operation is as follows:

When the control cut-out and reset switch $C^2$, on the No. 2 end of the leading locomotive, is closed, control battery current passes from conductor 55 at switch $C^2$ to conductor 79 and from thence through conductor $c^2$ to connector $x^9$ of automatic set-up switch S, and through conductor 80 and valve magnet $V^2$ to the negative side of the control battery at 61. This causes automatic set-up switch S to connect circuits as indicated by connectors $x^1$ to $x^9$.

Control battery current from conductor 62 then flows through connector $x^8$ to conductor $c^1$ of train line jumper cable entering the second locomotive over conductor $c^2$, which in turn leads to connector $x^9$ of the automatic set-up switch S of the second locomotive, and thence current passes over conductor 80, through valve magnet $V^2$, to negative control battery connection 61, energizing valve magnet $V^2$ and causing the automatic set-up switch S on the second locomotive to connect circuits as indicated by connectors $x^1$ to $x^9$. The operation of set-up switch S of the third locomotive is similarly accomplished from the circuits set-up by switch S of the second locomotive.

The positive side of the power supply circuit is energized through conductor 63, connector $x^7$ and conductor 22. The negative side of the circuit is also closed, for the decoding stage of the equipment through conductor 23, connector $x^6$ and conductor 64; and for the amplifying stages through conductor 59, control cut-out and reset switch $C^2$, conductor 81, connector $x^6$ and conductor 64. Accordingly, the decoding relays on all locomotive units are energized whereas the amplifier of only the leading unit is energized since the only control cut-out and reset switch in "on" position is the one at the engineman's station on the leading locomotive.

The receiver $TR^2$ on the No. 2 end is in this arrangement automatically selected, the circuit to the code converting equipment being from conductor 82 to connector $x^5$ and thence to conductor 67, and the return circuit being over conductor 65.

In the repeating of cab signals on trailing units, energy from the positive side of the power supply flows from conductor 22 through master relay armature 7 to contact $m^2$ to conductor 73, and thence through connector $x^2$ to conductor $a'$, entering the second locomotive over conductor $a^2$, and passing through connector $x^1$ to conductor 75. Conductor 75 leads to master relay coil 71, and from the mid-tap 72 the energy flows to conductor 23, and to connector $x^6$, returning to the first locomotive over conductor $e$. Thus the master relay armature of the second locomotive is moved to contact $m^1$.

When the master relay armature 7 on the first locomotive moves to contact $m^1$, actuated by the coded current in the relay circuit, energy flows from conductor 22 through the master relay armature 7 to contact $m^1$ and thence through conductor 68 to connector $x^3$ where it passes to conductor $b^1$ of the train line jumper cable, entering the second locomotive over conductor $b^2$ and passing through connector $x^4$ of the set-up switch S to conductor 70, and thence to master relay coil 71, leaving by the mid-tap 72 and passing over conductor 23 through connector $x^6$ and conductor 4 returning to the first locomotive. Thus the master relay armature 7 on the second locomotive is caused to operate in step with the master relay armature on the leading locomotive. Cab signals are repeated between the second and third locomotives in a similar manner.

Acknowledgment of a change to a more restrictive signal indication is accomplished in a manner similar to that previously described, except that acknowledging switch $A^2$ on No. 2 end of the leading locomotive is used, and the circuits between acknowledging switch $A^2$ and the acknowledging relays are completed through control cut-out and reset switch $C^2$ which connects conductor 78 with conductor 83.

Locomotives arranged in irregular order

The operation of a group of locomotives connected in regular sequence, that is with their ends in the order 1—2, 1—2, 1—2, or in the order 2—1, 2—1, 2—1, has been described. In many cases this arrangement will not exist, but an arrangement of the ends of the locomotives in an order such as 1—2, 2—1, 1—2 may occur, or still other irregular combinations may occur. For the purpose of description an arrangement in which the ends are in the order 1—2, 2—1, 1—2, will be chosen, the engineman operating from the No. 1 end of the first locomotive.

In any arrangement as to the order in which the ends of locomotives of a group are coupled, the automatic set-up switch S must automatically connect the circuits in proper manner when the control cut-out and reset switch is closed at the engineman's position. When three locomotives are grouped in the irregular order referred to, control cut-out and reset switch $C^1$ is closed. Current from the control battery energizes magnet valve $V^1$ to move the set-up switch to the position in which its connectors $y^1$ to $y^9$ are closed. Current flows from conductor 62 through connector $y^9$ to conductor $c^2$, and enters the second locomotive, the No. 2 end of which is forward, passing to the automatic set-up switch S, and through connector $x^9$ to valve magnet $V^2$, which is energized and causes the set-up switch of the second locomotive to close the contacts indicated at connectors $x^1$ to $x^9$. Current flows from conductor 62 of the second locomotive through connector $x^8$ to conductor $c^1$ of train line jumper cable, entering the third locomotive over conductor $c^1$ which joins at connector $y^8$ with conductor 60, which in turn leads to magnet valve $V^1$, causing the set-up switch S of the third locomotive to assume the position in which the connectors $y^1$ to $y^9$ are effective.

The supply circuits are energized in a manner similar to that previously described. The decoding and amplifying stages on the first locomotive are energized as described for the locomotives arranged in regular order, operating from the No. 1 end. On the second locomotive the decoding stage only of the code converting equipment is energized, as described for the locomotive, operating the group of locomotives from No. 2 end.

The decoding stage of the equipment on the third locomotive is energized as described in the arrangement as described for the locomotives arranged in regular order operating from No. 1 end.

The receiver circuits are selected as previously described in the arrangement in which the locomotives are coupled in regular order and operated from the No. 1 end of the first locomotive of the group. The circuits for repeating cab signal indications are as follows: From conductor 22 on the first locomotive current passes through the master relay armature 7 to contact $m^2$ of conductor 73 to automatic set-up switch S to conductor $a^2$, entering second locomotive over conductor $a^2$ passing to automatic set-up switch S on the second locomotive, thence to conductor 75, to master relay coil 71, leaving by mid-tap 72 and returning to the first locomotive over conductor $e$. When the master relay reverses on the first locomotive, due to the code current in the track, current flows from conductor 22, to contact $m^1$, to conductor 68, to the automatic set-up switch S, and thence to conductor $b^2$, entering the second locomotive over conductor $b^2$, and passing to the automatic set-up switch S of the second locomotive, thence to conductor 70 and master relay coil 71, leaving by mid-tap 72, and returning to the first locomotive over conductor $e$ through the circuits previously described.

From the second to the third locomotive the circuits are as follows: From conductor 22 current passes through master relay armature 73 to conductor $a^1$ passing through the train line jumper cable, entering the third locomotive over the conductor $a^1$ and passing through the automatic set-up switch S to conductor 75 and thence to master relay coil 71, leaving by mid-tap 72 and returning to the second locomotive over conductor $e$ by circuits as previously described.

When the master relay on the second locomotive reverses, current flows from conductor 22 through the master relay armature 7 to contact $m^1$ to conductor 68 and the automatic set-up switch S to conductor $b^1$ passing through the train line jumper cable, entering the third locomotive over conductor $b^1$ to the automatic set-up switch S, thence passing through conductor 70 and the master relay coil 71, leaving by mid-tap 72 returning to the second locomotive over conductor $e$ by circuits previously described.

When a group of locomotives are coupled together in any arrangement as to order, the action and connections established by the acknowledging relays $P^1$, $P^2$ and $P^3$ are identical on each unit. However, the pick-up circuits of the relays of the second, third and other units, are established from the equipment on the leading unit, thus: when the acknowledging switch of the leading unit, say acknowledging switch $A^1$ is reversed (with control cut-out and reset switch $C^1$ closed) current flows from conductor 22 (positive), over contact 8 (dropped) of decoding relay $R^1$ to conductor 94, to conductor 90, to conductor 78, through control cut-out and reset switch $C^1$ to conductor 76, through acknowledging switch $A^1$, to conductor 77, to conductor $d$, through the train line jumper cable to the second locomotive, through the acknowledging relays of this locomotive, and then returns to the first locomotive over conductor $e$. The same procedure occurs on the third and other locomotives. The stick circuits established on the second or other locomotives are, however, energized from the power source of each individual locomotive.

From the above description of various arrangements in which locomotives carrying the signal equipment of this invention may be coupled, it will be noted that, irrespective of the order of the ends of a group of locomotives, the circuits rendered effective by the operation of the control cut-out and reset switches and the automatic set-up switch of each unit, serve to select the proper track receiver to be utilized; to direct repeat code impulse in the proper direction from one unit to another; to energize the entire code converting equipment of the leading locomotive and only the decoding circuits of the trailing locomotives; to permit acknowledgment only from the engineman's position on the leading locomotive; and to perform other useful functions.

While there has been described in some detail a particular form of cab signal equipment designed to operate with similar equipment on a second vehicle or a group of vehicles, it will be apparent to those skilled in the art that changes may be made in the form of the apparatus herein described, that the equipment of trailing vehicles need not be identical in every respect with that of the leading vehicle, and that certain features of the invention may at times be used to advantage without a corresponding use of other features, all without departing from the spirit of the claims hereto annexed.

Having thus described our invention, we claim:

1. In a railway vehicle, signal equipment responsive to wayside coded current comprising a receiver, a plurality of indicators and means for decoding coded current induced into said receiver to convert the same into visible indications at said indicators, said means including a source of electrical energy independent of the coded current, and conductors leading from a stage of said code converting means, beyond the introduction of the independent electrical energy and in advance of the decoding stage, to the end of said vehicle and adapted for connection with conductors on a similarly equipped second vehicle whereby the indications may be concurrently effected on both vehicles.

2. In a railway vehicle, signal equipment responsive to wayside coded current comprising a receiver, a plurality of indicators, and means for amplifying and decoding the coded current induced into said receiver to convert the same to visible indications at said indicators, conductors leading from a stage of said code converting means beyond the amplifying stage and in advance of the decoding stage to the end of said vehicle and adapted for connection with conductors on a similarly equipped second vehicle whereby indications may be concurrently effected on both vehicles.

3. In a railway vehicle, signal equipment responsive to wayside coded current comprising receivers at each end of said vehicle, and means for converting coded current induced into either of said receivers into visible indications, repeat circuits adapted for connection between said code converting means and the code converting means of a similarly equipped second vehicle coupled at either end of the first vehicle, and a switch for automatically selecting the proper repeat circuit and receiver to be utilized according to the manner in which the ends of the two vehicles are coupled.

4. In a railway vehicle, signal equipment responsive to wayside coded current comprising receivers, one at each end of said vehicle, means for converting coded current induced into either of said track receivers into visible indications, conductors leading from said code converting means to both ends of said vehicle and adapted for connection with conductors on a similarly equipped second vehicle, a switch automatically adapted to assume one position when the vehicle is moving in one direction and another position when the vehicle is moving in the reverse direction, said switch serving to render effective the forward receiver and rearwardly directed conductors, irrespective of the heading of the vehicle.

5. In a railway vehicle, signal equipment responsive to wayside coded current comprising a receiver, means for converting coded current induced into said receiver into visible indications, conductors leading from said code converting means to both ends of said vehicle and adapted for connection with a similarly equipped second vehicle coupled to the first vehicle whereby indications may be concurrently effected on both vehicles, a set-up switch for selecting the proper conductors by which energy is transmitted to a second vehicle to repeat the indications thereon, and means whereby when similarly equipped vehicles are coupled together the set-up switch of the leading vehicle will automatically operate the set-up switch of the trailing vehicle.

6. In a railway vehicle, signal equipment responsive to wayside coded current comprising a receiver, means for converting coded current induced into said received into visible indications, conductors leading from said code converting means to both ends of said vehicle and adapted for connection with a similarly equipped second vehicle coupled to the first vehicle, master control switches governing the direction of propulsion of the vehicle, and a set-up switch operated by said master control switches for automatically selecting the proper conductors for transmission of energy to a second vehicle to repeat the indications thereon, and means whereby when two such similarly equipped vehicles are coupled together, the set-up switch of the leading vehicle will automatically operate the set-up switch of the trailing vehicle.

7. In a railway vehicle, signal equipment responsive to wayside current to produce different indications, some of the devices of said equipment being provided in duplicate with a set for each end of the vehicle, and an automatic set-up switch adapted to be moved to one of two positions to render effective one or the other set of duplicate devices, a pair of magnets for controlling the position of said set-up switch, and means for selectively energizing one or the other of said magnets, whereby the automatic switch is moved to one position when the vehicle is heading in one direction, and to the other direction when the vehicle is heading in the reverse direction.

8. In a railway vehicle, signal equipment responsive to wayside currents to produce different indications, a receiver at each end of the vehicle, an automatic set-up switch adapted to be moved to one of two positions to connect one or the other of said receivers with said signal equipment, a pair of magnets for controlling the position of said set-up switch, and means for selectively energizing one or the other of said magnets whereby the automatic switch is moved to one position when the vehicle is heading in one direction and to the other position when the vehicle is heading in the reverse direction.

9. In a railway vehicle, signal equipment responsive to wayside coded current to produce different indications, two sets of conductors leading from said signal equipment, one set to each end of said vehicle and adapted to transmit coded energy to a similarly equipped trailing vehicle coupled at either end of the first vehicle, master control switches, governing the direction of propulsion of the vehicle, and a set-up switch operated by said master control switches, said set-up switch serving to automatically select the proper set of conductors for transmitting energy to the trailing vehicle irrespective of which end of the leading vehicle is coupled to the trailing vehicle.

10. In a railway vehicle, signal equipment responsive to wayside coded current to produce different indications, two sets of conductors leading from said signal equipment, one set to each end of said vehicle, and adapted to transmit energy to a similarly equipped second vehicle coupled at either end of the first vehicle to repeat signal indications on said second vehicle, and a directional switch adapted to assume one position when operated from the engineman's station at one end of the vehicle and to assume another position when operated from the engineman's station at the other end of the vehicle, said directional switch including means for automatically selecting the proper set of conductors for transmitting energy to the second vehicle.

11. In a railway vehicle, signal equipment responsive to wayside coded current to produce different indications, a receiver at each end of the vehicle, a set-up switch having two sets of connectors, one set effective when the vehicle is heading in one direction to connect one track receiver with the signal equipment, and the other set effective when the vehicle is heading in the reverse direction to connect the other track receiver with the signal equipment, conductors leading from the signal equipment to both ends of said vehicle and adapted to transmit energy to a similarly equipped second vehicle coupled at either end of the first vehicle to repeat signal indications on said second vehicle, said set-up switch including means whereby when the second vehicle is coupled to one end of the first vehicle, the conductors at that end of the first vehicle will be automatically rendered effective to transmit coded current to the equipment of the second vehicle and the track receiver at the other end of the first vehicle will be rendered effective for the reception of coded current into the first vehicle.

12. In a railway vehicle, signal equipment responsive to wayside coded current comprising a receiver, a plurality of indicators, and means for amplifying and decoding the coded current induced into said receiver to convert the same into visible indications at said indicators, and conductors leading from a stage of said code converting means to the end of said vehicle and adapted for connection with a similarly equipped second vehicle, and means whereby when two such similarly equipped vehicles are coupled together the amplifying equipment of only the leading vehicle will be energized and the decoding equipment of both vehicles will be energized.

13. In a railway vehicle, signal equipment responsive to wayside coded current comprising a receiver, a plurality of indicators, and means for amplifying and decoding the coded current induced into said receiver to convert the same into visible indications at said indicators, said means including a source of electrical energy independent of the coded current, and conductors leading from a stage of said amplifying and decoding means beyond the introduction of the independent electrical energy and in advance of the decoding stage to the end of said vehicle and adapted for connection with conductors of a similarly equipped second vehicle, and means whereby when two such similarly equipped vehicles are coupled together the amplifying and decoding equipment of the leading vehicle will be energized and only the decoding equipment of the trailing vehicle will be energized.

14. In a railway vehicle, signal equipment responsive to wayside coded current comprising means for receiving, amplifying, and decoding the coded current to convert the same to visible indications, master control switches for governing the direction of propulsion of the vehicle, a set-up switch operated by said master control switches to assume one position when the vehicle is moving in one direction and another position when the vehicle is moving in the other direction, and circuits between said master control swicthes, set-up switch and a stage of said code converting means intermediate the amplifying and decoding stage adapted for connection with a similarly equipped trailing vehicle whereby when two such similarly equipped vehicles are coupled together the amplifying and decoding equipment of the leading vehicle will be energized and only the decoding equipment of the trailing vehicle will be energized.

15. In a railway vehicle signal equipment comprising means for receiving coded current and converting the same to visible indications, means for acknowledging a change to a more restrictive indication, conductors leading from said code converting equipment to a similarly equipped second vehicle to repeat signal indications thereon, and means whereby when two such similarly equipped vehicles are coupled together acknowledgment can only be made on the leading vehicle.

16. In a railway vehicle signal equipment comprising means for receiving coded current and for converting the same to visible indications, switches, one for each end of said vehicle, having means associated therewith for acknowledging a change to a more restrictive indication, master control switches, one for each end of the vehicle, governing the direction of propulsion of the vehicle, conductors leading from said code converting equipment to a similarly equipped second vehicle, and means whereby when two such similarly equipped vehicles are coupled together acknowledgment can only be made from the acknowledging switch of the leading vehicle corresponding to the end at which the master control switch has been closed.

17. In a railway vehicle having two engineman's control stations, one at each end of the vehicle, signal equipment comprising means for receiving coded current and converting the same to visible indications, means for transmitting energy from said signal equipment to repeat the indications on a similarly equipped second vehicle, and means for setting up one set of circuits when one control station is selected and another set of circuits when the other control station is selected, said set-up means automatically controlling the direction in which repeat energy is transmitted from the leading vehicle to the trailing vehicles when two similarly equipped vehicles are coupled together.

18. In a railway vehicle having two engineman's control stations, one at each end of the vehicle, train-carried receivers, one at each end of the vehicle, signal equipment comprising means for receiving coded current and converting the same to visible indications, means for transmitting energy from said signal equipment to repeat the indications on a similarly equipped second vehicle, and means for setting up one set of circuits when one control station is selected and another set of circuits when the other control station is selected, said set-up means automatically controlling the direction in which repeat energy is transmitted from the leading vehicle to the trailing vehicles when two similarly equipped vehicles are coupled together, and said set-up means automatically selecting a train-carried receiver corresponding to the control station selected.

19. In a railway vehicle having two engineman's control stations, one at each end of the vehicle, signal equipment comprising means for receiving coded current and converting the same to visible indications, means for transmitting energy from said signal equipment to repeat the indications on a similarly equipped second vehicle, and means for setting up one set of circuits when one control station is selected and another set of circuits when the other control station is selected, said set-up means automatically controlling the direction in which repeat energy is transmitted from the leading vehicle to the trailing vehicles when two similarly equipped vehicles are coupled together, and said set-up means controlling set-up means on the second vehicle whereby energy may be transmitted from the second vehicle to a similarly equipped third vehicle to repeat indications thereon.

In testimony whereof, we have hereunto signed our names.

ARCHIE D. WHAMOND.
ANDERS GUSTAF GUNNAR SALENIUS.